Aug. 26, 1930.                    T. CORY                    1,774,355
                          SEED REMOVER FOR GRAPEFRUIT
                              Filed June 7, 1929
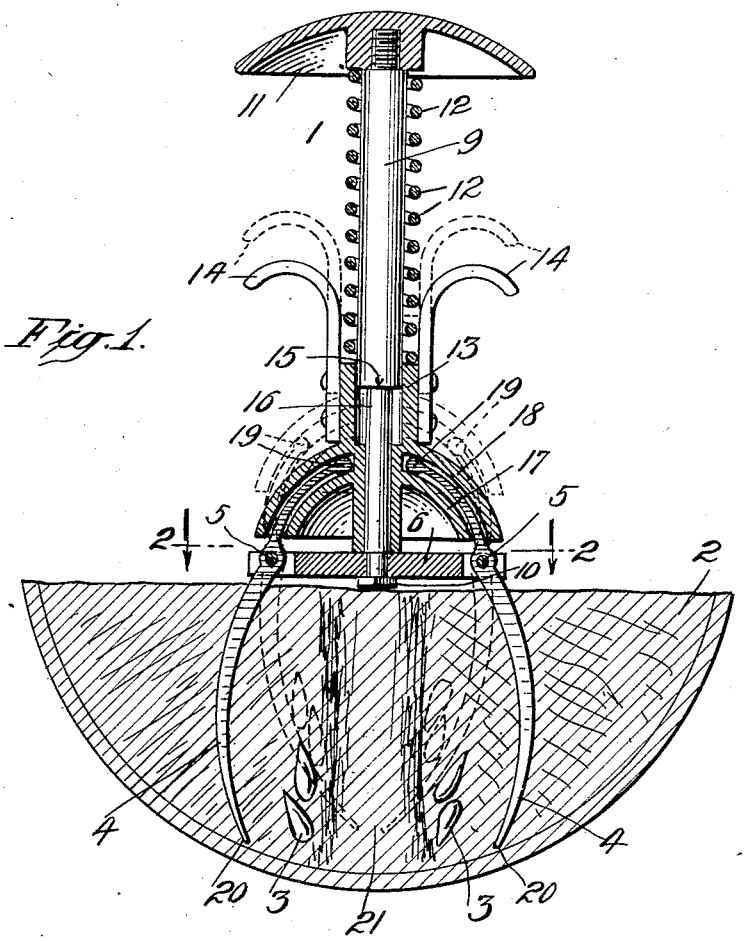
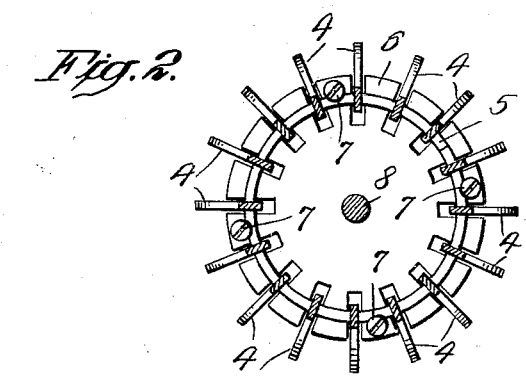
INVENTOR
TONY CORY
BY
O. Allen Edwards
ATTORNEY Patented Aug. 26, 1930

1,774,355

UNITED STATES PATENT OFFICE

TONY CORY, OF NEW YORK, N. Y.

SEED REMOVER FOR GRAPEFRUIT

Application filed June 7, 1929. Serial No. 369,186.

The object of my invention is to provide a seed remover which may be used on half a grapefruit, so as to capture all the seeds and remove the same with ease and facility and without injury to the grapefruit. This and other objects are accomplished by my invention, one embodiment of which is hereinafter more particularly set forth.

For a more detailed description of my invention, reference is to be had to the accompanying drawings, forming a part hereof, in which Figure 1 is a sectional view of my improved seed remover; and Figure 2 is also a sectional view taken on the line 2—2 of Figure 1, looking in the direction of the arrows.

Throughout the various views of the drawings, similar reference characters designate similar parts.

My improved seed remover 1 may be used on a half of a grapefruit, which is indicated at 2, of the conventional kind, i. e., one with plenty of seeds 3, which are placed in the various sections. These seeds are removed by means of fingers 4 which are pivoted on a wire 5 in a recess of a disc 6 which is slotted so as to let the fingers 4 swing freely. Any number of fingers may be used, as is desired, but in the preferred embodiment of my invention, I use sixteen as I have found this serves every purpose. The wire 5 is preferably held in place by means of four cap screws 7, which rest thereon. The centre of the disc 6 is perforated to receive the reduced end 8 of the handle 9 and a knot 10 on the lower end of the part 8 holds the disc in place. At the extreme upper end of the handle 9 is another disc 11 which is screw-threaded to the handle or held in any other suitable way and against this presses a coiled spring 12 which also presses on the slide 13 which rises and falls on the shank of the handle 9, as indicated. Finger holds 14 are fixed to the slide 13 in any suitable manner, so that they may be drawn, as indicated by dotted lines, towards the disc 11 against the tension of the spring 12 or shoved away by the tension of the spring 12. The downward movement of the slide is limited by the disc 6 and the upward movement is limited by a shoulder 15 at the upper end of the second reduced portion 16, on which the principal part of the slide is fixed. The slide 13, in the embodiment shown, has two concentric and substantially parallel bell shaped discs 17 and 18 between which the upper curved ends of the fingers 4 are placed. These fingers are each provided with enlarged disc ends 19 which engage the walls of the bell shaped discs 17 and 18 so as to swing on the wire pivot 5, either toward the spindle or handle 9 when lowered and away from this handle when raised, as indicated by dotted lines. When these parts 19 swing, as above stated, it is obvious that the points 20 of the fingers 4 swing in the opposite direction, so that when they are in the position indicated by dotted lines, they rub against the core 21 of the grapefruit 2.

When the device is in use, it is thrust with open fingers to the bottom of the grapefruit, and thereafter without raising the disc 11, or shifting the position of the disc 6, the finger holds 14 are raised and thereby the bell shaped discs 17 and 18 are raised, so as to swing the ends 20 inwardly to the core 21 and capture the seeds between the fingers and the core. The entire instrument is then raised and separated from the grapefruit and the seeds are caught between the fingers and are then removed and deposited where desired, and thereafter the instrument may be u again on another half of a grapefruit to remove seeds in a like manner.

While I have shown and described one embodiment of my invention, it is obvious that it is not restricted thereto, but that it is broad enough to cover all structures which come within the scope of the annexed claims.

Having thus described my invention, what I claim is:

1. In a device of the class described, a handle with a series of fingers connected thereto and means for opening or closing the fingers so that the same may be brought under the seeds of a grapefruit so as to capture the same.

2. In a device of the class described, a handle with a spindle, a hand disc at the upper end of the spindle, and a finger disc at the lower end thereof, fingers secured to the finger disc and means including curved discs for opening or closing the fingers connected to the handle so that an operator may bring parts toward each other and close the fingers and permit parts to separate and thereby open the fingers as desired so that the same may be brought under the seeds of a grapefruit so as to capture the same.

3. In a device of the class described, a handle with a spindle and a coiled spring surrounding the spindle, a series of bell shaped discs riding on the spindle and pressed by the spring, a set of fingers, a wire on which the fingers are mounted, means on the fingers for engaging the bell shaped discs, means for holding the fingers in proper relation while pivoted on the wire, and for supporting the wire, and holding the wire in fixed relation to the handle so that the same may be brought under the seeds of a grapefruit so as to capture the same.

In testimony whereof, I have hereunto set my hand this 4th day of June, 1929.

TONY CORY.